United States Patent [19]

Conner

[11] Patent Number: 4,738,424

[45] Date of Patent: Apr. 19, 1988

[54] APPARATUS FOR SECURING ARTICLES

[75] Inventor: Gary M. Conner, Houston, Tex.

[73] Assignee: Guide-Pro, Inc., Houston, Tex.

[21] Appl. No.: 42,066

[22] Filed: Jun. 15, 1987

[51] Int. Cl.$^4$ .............................................. B42F 13/00
[52] U.S. Cl. ..................................... 248/340; 248/303
[58] Field of Search ............... 248/214, 340, 302, 303, 248/317, 228, 231.7, 72, 227, 343, 215, 231.8; 294/5.5; 24/533, 551, 552, 553

[56] References Cited

U.S. PATENT DOCUMENTS

| 93,456 | 8/1869 | Lines | 24/551 |
|---|---|---|---|
| 1,030,462 | 6/1912 | Conant | 24/553 X |
| 1,176,210 | 3/1916 | Farley | 24/552 X |
| 1,222,510 | 4/1917 | Zirkle | 24/551 |
| 2,284,004 | 5/1942 | McCurdy | 24/551 X |
| 2,847,743 | 8/1958 | Voss | 24/552 X |
| 3,936,913 | 2/1976 | Weissman | 248/228 X |

FOREIGN PATENT DOCUMENTS

| 868582 | 2/1953 | Fed. Rep. of Germany | 24/552 |
|---|---|---|---|
| 1169370 | 12/1958 | France | 248/214 |
| 12122 | of 1889 | United Kingdom | 24/551 |
| 14660 | of 1894 | United Kingdom | 24/551 |

Primary Examiner—J. Franklin Foss

[57] ABSTRACT

A support or attachment for attaching lines or articles to a tree branch or other cylindrical structure. The apparatus includes two springed flanges biased by the spring. The flanges include opposed-opening hooks, one at the end of each flange. The hooks form an opening when the springed flanges are compressed, form a closed attachment means where the flanges are released and are substantially co-planar when in the compressed and released positions.

1 Claim, 1 Drawing Sheet

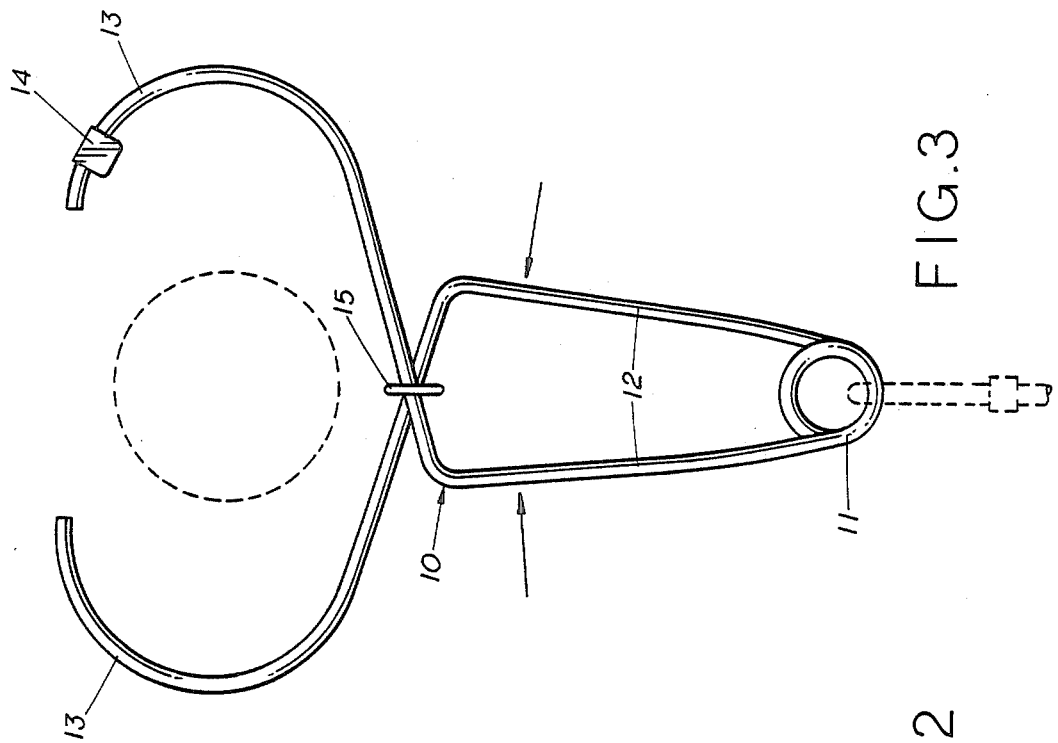
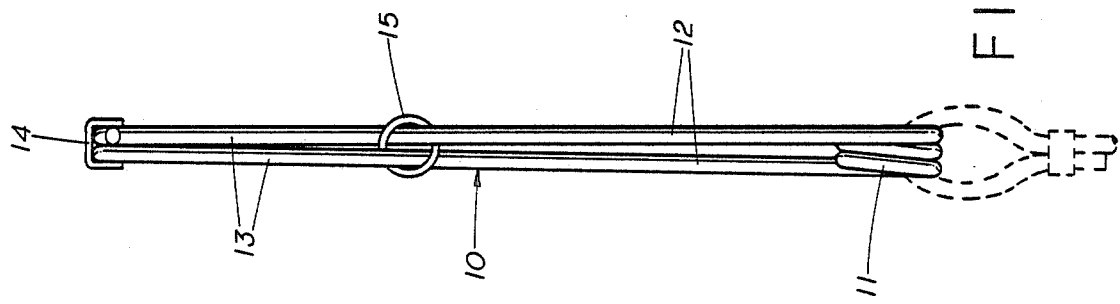
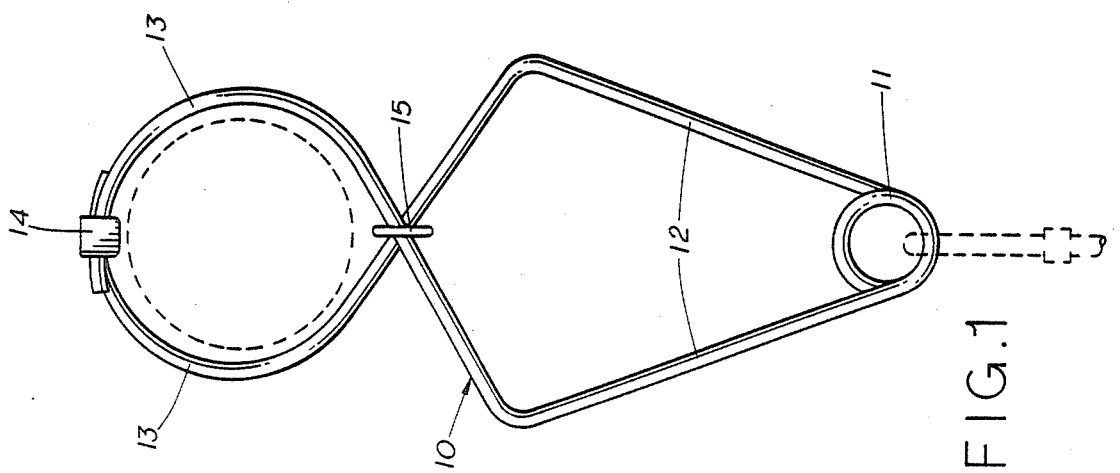

APPARATUS FOR SECURING ARTICLES

BRIEF SUMMARY OF THE INVENTION

This invention relates to an apparatus for securing articles to a line, rod or other elongated cylindrical support. Generally, the attachment apparatus comprising this invention is for use with outdoor equipment or recreational activities.

The apparatus embodying the invention includes springed flanges having opposed hooks thereon which overlap to provide positive non-frictional engagement about an object when the flanges are closed and an opening when the hooks are urged apart through which the apparatus may be engaged or disengaged from the object.

The invention may be used to secure lines for boats or other tethers to a rod, tree branch or other support. The apparatus also may be used for suspending camp lanterns, tent lines or other equipment at a campsite.

The invention provides a quickly attachable and releaseable positive engagement with a support and is operable with only one hand of the user. No tying of lines, driving of stakes for tent supports or other time-consuming method of attachment need be utilized in connection with the present invention.

BRIEF DESCRIPTION OF THE DRAWINGS

FIG. 1 is a front view of one embodiment of the invention in the released or closed position.

FIG. 2 is a side view of the embodiment shown in FIG. 1 also showing the apparatus in the released or closed position.

FIG. 3 is a front view of the embodiment shown in FIGS. 1 and 2 in the open or compressed position about to be engaged or disengaged with a support.

DETAILED DESCRIPTION OF THE INVENTION

Referring now to FIG. 1, a preferred embodiment of the support is generally indicated by the numeral 10. In this embodiment, support 10 is formed of resilient material such as spring steel, high impact plastic or the like and is a unitary construction consisting of a wound spring 11, two flanges 12 extending from wound spring 11 and the opposed hooks 13 overlapping at the ends thereof. This embodiment of support 10 is provided with a hook retainer 14 for retaining hooks 13 in general co-planar relationship when flanges 12 are released and encircled about a support or fixed object from which equipment (not shown) is desired to be affixed.

Referring now to FIG. 3, a retaining ring 15 is provided to maintain hooks 13 in a generally co-planar relationship when flanges 12 have been compressed, thereby opening hooks 13 to engage or disengage support 10 from the object to which it will be or has been engaged. FIG. 2 shows the substantially co-planar relationship of hooks 13 and the retaining means of hook retainer 14 and retaining ring 15 when support 10 is in the released, or grasping position also shown in FIG. 1.

This embodiment can be operated with one hand by the user and provides positive engagement to support loads or provide positive grasping engagement with a fixed object from which equipment or the like is to be supported. The positive engagement of hooks 13 derive from the fact that each hook encircles over 180 degrees of the object to be grasped. The end of each hook is bent back toward pivot 11, terminating at a point radially inward of its maximum radial dimension measured from pivot 11. The invention provides non-frictional engagement to join an object to a support and consequently is less likely to be disengaged accidentally or by a sharp tug as frictionally engaging devices might be. The resistance to accidental disengagement is only limited by the choice of materials in its construction and the resistance of such materials to deformation in the area of hooks 13.

This embodiment can also be used as a temporary anchor to an object extending above the water such as a tree, offshore platform or the like to which a boat may be tethered by means of a line. The apparatus is quickly engageable and disengageable with a fixed support and can be used to secure various pieces of camping equipment and the like to supports at a campsite.

Another embodiment (not shown) of the invention could provide extensions to the flanges on the side of the spring opposite the hooks which, when compressed, would open the hooks and, when released, close the hooks to form a closed overlapping attachment.

Further modifications and alternative embodiments of the invention will be apparent to those skilled in the art in view of this description. Accordingly, this description is to be construed as illustrative only and is for the purpose of teching those skilled in the art the manner of carrying out the invention. It is to be understood that the form of the invention herewith shown and described is to be taken as the presently preferred embodiment. Various changes may be made in the shape, size and arrangement of parts. For example, equivalent elements or materials may be substituted for those illustrated and described herein, parts may be reversed, and certain features of the invention may be utilized independently of the use of other features, all as would be apparent to one skilled in the art after having the benefit of this description.

What is claimed is:

1. In a support for securing articles to a pole or branch, the combination comprising:

a unitary handle and grasping member including two flanges and a springed pivot joining said flanges and biasing said flanges with respect to each other;

an opposing hook on the end of each said flanges opening toward the other of said hooks and located on the same end of flanges relative to said springed pivot;

said hooks forming a closed overlapping grasping means, each of which encircles greater than 180 degrees of the object to be grasped when said spring is released—and forming an opening between said hooks when said flanges are compressed toward each other; and means located at the apex of said hooks for retaining said flanges and said hooks together in a substantially co-planar relation in the plane perpendicular to the axis of said springed pivot when said hooks are overlapped and engaged with the object to be grasped.

* * * * *